(12) United States Patent
Poghosyan et al.

(10) Patent No.: US 11,770,382 B1
(45) Date of Patent: Sep. 26, 2023

(54) DYNAMIC PRIVILEGED ACCESS GOVERNANCE

(71) Applicants: Artyom Poghosyan, Glendale, CA (US); Alexander Gudanis, Glendale, CA (US); Sameer Hiremath, Glendale, CA (US)

(72) Inventors: Artyom Poghosyan, Glendale, CA (US); Alexander Gudanis, Glendale, CA (US); Sameer Hiremath, Glendale, CA (US)

( * ) Notice: Subject to any disclaimer, the term of this patent is extended or adjusted under 35 U.S.C. 154(b) by 155 days.

(21) Appl. No.: 17/352,014

(22) Filed: Jun. 18, 2021

Related U.S. Application Data

(60) Provisional application No. 63/040,685, filed on Jun. 18, 2020.

(51) Int. Cl.
*H04L 9/40* (2022.01)

(52) U.S. Cl.
CPC .......... *H04L 63/105* (2013.01); *H04L 63/104* (2013.01); *H04L 63/108* (2013.01); *H04L 63/20* (2013.01)

(58) Field of Classification Search
CPC ... H04L 63/105; H04L 63/104; H04L 63/108; H04L 63/20
USPC ............................................................ 726/4
See application file for complete search history.

(56) References Cited

U.S. PATENT DOCUMENTS

| | | | |
|---|---|---|---|
| 2017/0295197 A1* | 10/2017 | Parimi | ................... H04L 63/10 |
| 2020/0045056 A1* | 2/2020 | Prasad | .................. H04L 63/107 |
| 2020/0412723 A1* | 12/2020 | Shankar | ................. H04L 63/10 |
| 2022/0345457 A1* | 10/2022 | Jeffords | ............. G06F 21/6218 |

* cited by examiner

*Primary Examiner* — Kambiz Zand
*Assistant Examiner* — Aubrey H Wyszynski
(74) *Attorney, Agent, or Firm* — Plager Schack LLP; Mark H. Plager; Stephen Hallberg

(57) ABSTRACT

A dynamic privileged access governance system and associated processes are disclosed. The dynamic privileged access governance system and processes are cloud-native and adapt to the dynamic nature of the cloud systems.

10 Claims, 10 Drawing Sheets

DYNAMIC PRIVILEGED ACCESS GOVERNANCE

CLAIM OF BENEFIT TO PRIOR APPLICATION

This application claims benefit to U.S. Provisional Patent Application 63/040,685, entitled "Dynamic Privileged Access Governance," filed Jun. 18, 2020. The U.S. Provisional Patent Application 63/040,685 is incorporated herein by reference.

BACKGROUND

Embodiments of the invention described in this specification relate generally to public cloud system privileged access, and more particularly, to a dynamic privileged access governance system and processes.

Public cloud systems such as Amazon Web Services, Microsoft Azure, Google Cloud Platform, and others offer business benefits including agility, cost savings, and scalability. However, public cloud systems also introduce new security risks, especially related to privileged user access. Inadequate security controls in public cloud systems result in confidential data breaches, business disruption, and financial losses, among other maladies.

Existing security solutions do not meet the business requirements for public cloud systems since the existing security solutions were built for on-premise IT systems.

Therefore, what is needed is a way to provide secure, privileged access in a way that is cloud-native and adapts to the dynamic nature of the cloud systems.

BRIEF DESCRIPTION

A novel dynamic privileged access governance system and associated dynamic privileged access governance processes are disclosed. In some embodiments, the dynamic privileged access governance system comprises a just-in-time access system and an access intelligence system.

In some embodiments, the just-in-time access system comprises an authentication module for user and admin user authentication and a profile module comprising a profile access manager, a profile configuration module, and a profile repository. In some embodiments, a user connects to the just-in-time access system to check out a profile providing privileged access to a cloud environment and check in the profile once the user is finished accessing the cloud environment. In some embodiments, an admin user connects to the just-in-time access system to configure one or more privileged access profiles. In some embodiments, the admin user configures each privileged access profile based on one of access requirements and recommendations made by the access intelligence system.

In some embodiments, the access intelligence system comprises a cloud application scanner, a privilege classification system, an activity processor with a user activity analyzer, and a profile recommendation module. In some embodiments, the privilege classification system comprises a data transformation engine, a basic classifier module, and an artificial intelligence (AI) & machine learning (ML) classifier module. In some embodiments, the cloud application scanner of the access intelligence system (i) scans permissions, permission assignments, and user activity in connection with one or more heterogeneous cloud applications, (ii) provides the permissions and permission assignments to the privilege classification system, and (iii) provides the user activity data to the activity processor for analysis by the user activity analyzer. In some embodiments, the privilege classification system and the activity process output data to the profile recommendation module which provides recommendations to the just-in-time access system for the admin user to review or update privileged access profiles for a user.

In some embodiments, the dynamic privileged access governance processes comprise a just-in-time privileged access profile check out and check in process, a privileged access profile configuration and recommended profile update process, and a plurality of access intelligence processes that run as services in connection with the access intelligence system. In some embodiments, the plurality of access intelligence processes that run as services in connection with the access intelligence system comprises a data ingestion service-based access intelligence process for continuously ingesting data from heterogeneous cloud applications, an activity analyzer service-based access intelligence process for deriving permissions associated with activities of a user, a privilege classification service-based access intelligence process for classifying permissions based on risk, and a profile recommendation service-based access intelligence process for providing recommendations on creating and tuning privileged access profiles.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
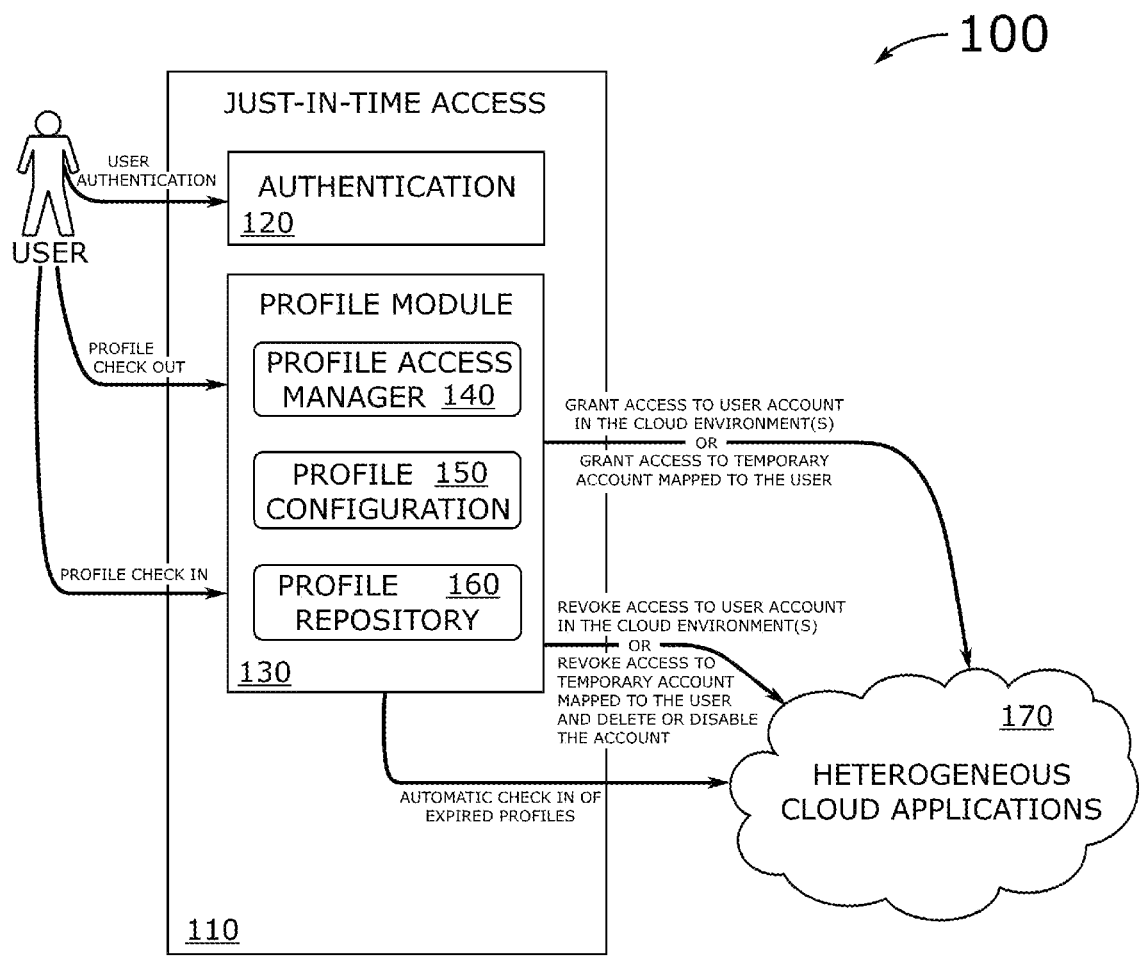
FIG. 1 conceptually illustrates a schematic view of just-in-time access by a user in some embodiments of the dynamic privileged access governance system.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel dynamic privileged access governance system and dynamic privileged access governance processes. In some embodiments, the dynamic privileged access governance system comprises a just-in-time access system and an access intelligence system.

In some embodiments, the just-in-time access system comprises an authentication module for user and admin user authentication and a profile module comprising a profile access manager, a profile configuration module, and a profile repository. In some embodiments, a user connects to the just-in-time access system to check out a profile providing privileged access to a cloud environment and check in the profile once the user is finished accessing the cloud environment. In some embodiments, an admin user connects to the just-in-time access system to configure one or more privileged access profiles. In some embodiments, the admin user configures each privileged access profile based on one of access requirements and recommendations made by the access intelligence system.

In some embodiments, the access intelligence system comprises a cloud application scanner, a privilege classification system, an activity processor with a user activity analyzer, and a profile recommendation module. In some embodiments, the privilege classification system comprises a data transformation engine, a basic classifier module, and an artificial intelligence (AI) & machine learning (ML) classifier module. In some embodiments, the cloud application scanner of the access intelligence system (i) scans permissions, permission assignments, and user activity in connection with one or more heterogeneous cloud applications, (ii) provides the permissions and permission assignments to the privilege classification system, and (iii) provides the user activity data to the activity processor for analysis by the user activity analyzer. In some embodiments, the privilege classification system and the activity process output data to the profile recommendation module which provides recommendations to the just-in-time access system for the admin user to review or update privileged access profiles for a user.

In some embodiments, the dynamic privileged access governance processes comprise a just-in-time privileged access profile check out and check in process, a privileged access profile configuration and recommended profile update process, and a plurality of access intelligence processes that run as services in connection with the access intelligence system. In some embodiments, the plurality of access intelligence processes that run as services in connection with the access intelligence system comprises a data ingestion service-based access intelligence process for continuously ingesting data from heterogeneous cloud applications, an activity analyzer service-based access intelligence process for deriving permissions associated with activities of a user, a privilege classification service-based access intelligence process for classifying permissions based on risk, and a profile recommendation service-based access intelligence process for providing recommendations on creating and tuning privileged access profiles.

As stated above, public cloud systems such as Amazon Web Services, Microsoft Azure, Google Cloud Platform, and others offer business benefits including agility, cost savings, and scalability. However, public cloud systems also introduce new security risks, especially related to privileged user access. Inadequate security controls in public cloud systems result in confidential data breaches, business disruption, and financial losses, among other maladies. While there are some existing security solutions available, none of them meet the business requirements for public cloud systems since the existing security solutions were built for on-premise IT systems. Embodiments of the dynamic privileged access governance system and processes described in this specification solve such problems by (i) identifying privileged access, (ii) associating the identified privileged access with users and other systems that use the privileged access, and (iii) dynamically granting privileged access, when required by users, to perform authorized activities. In addition, the dynamic privileged access governance system monitors privileged activity to ensure that users and/or systems are only granted the minimum required privileges to perform the privileged activity or task at all times.

Embodiments of the dynamic privileged access governance system and processes described in this specification differ from and improve upon currently existing security solutions and other existing security options. In particular, the dynamic privileged access governance system and processes are designed specifically for public cloud systems and directly address the business requirements for cloud. Furthermore, the dynamic privileged access governance system and processes are cloud-native and adapts to the dynamic nature of the cloud systems. By contrast, the existing security solutions and other existing security options are too rigid and do not scale for public cloud needs.

The dynamic privileged access governance system of the present disclosure may be comprised of the following elements. This list of possible constituent elements is intended to be exemplary only and it is not intended that this list be used to limit the dynamic privileged access governance system of the present application to just these elements. These elements may be implemented as software modules that are deployed in various computer hardware-based systems and operate across networked environments. Persons having ordinary skill in the art relevant to the present disclosure may understand there to be equivalent elements that may be substituted within the present disclosure without changing the essential function or operation of the dynamic privileged access governance system.

1. Access intelligence for the dynamic privileged access governance system utilizes data collected from heterogeneous cloud environments to classify certain types of access permissions as privileged based on basic techniques such as keyword identification or access maps and advanced techniques utilizing both artificial intelligence (AI) and machine learning (ML).

2. Access profiles are created based on a combination of the type of access, the characteristics or attributes of users (e.g., job function or job role) for whom the access profiles are intended for use, and the frequency that a user uses the access granted within the access profile. After creation and configuration, the access profiles are stored in a profile repository for just-in-time access by the users.

3. Users are authorized for certain access profiles. Authorized users can access these profiles for a limited period of time. For example, an authorized user may view access profiles and check out a particular access profile that grants access to a user account in a particular heterogeneous cloud environment.

4. Access intelligence for the dynamic privileged access governance system also provides recommendations or automatically tunes access profiles based on user characteristics or attributes, usage statistics of access profiles, and permissions granted by these access profiles in the heterogeneous cloud environments.

The dynamic privileged access governance system of the present disclosure generally works by the dynamic privileged access governance system using access intelligence to scan all permissions, permission assignments to users, and services in the heterogeneous cloud environment. After scanning, access intelligence is used by the dynamic privileged access governance system to classify certain permissions as privileged. Basic techniques such as keyword identification or access maps are used in conjunction with advanced techniques utilizing both AI and ML to classify entitlements as being privileged. The dynamic privileged access governance system creates access profiles based on a combination of the type of access these access profiles provide (e.g., network access, storage access, computing access, etc.), characteristics of users that use these access profiles (e.g., characteristics such as job function or job role), and the frequency that a user uses the access granted within the access profile.

To use the dynamic privileged access governance system of the present disclosure, access profiles are granted to users which allow them to access various heterogeneous cloud environments. Additionally, users are granted access to heterogeneous environment only at the time they require access (Just-In-Time access). Access is provided to users in the heterogeneous environment by (i) directly assigning privileges to their existing user account, (ii) creating a new user account, (iii) mapping this account to the user and assigning privileges to this user account at the time the user requires access to the heterogeneous environment. After the user has completed their tasks or after a specified time interval has elapsed, access for the user is removed by (i) directly removing assigned privileges to their existing accounts, (ii) deleting the temporary account, or (iii) disabling the temporary account and then deleting the temporary account after a time period.

By way of example, FIG. 1 conceptually illustrates a schematic view of just-in-time access by a user 100 in some embodiments of the dynamic privileged access governance system. In some embodiments, the dynamic privileged access governance system organizes authentication, profile access, profile configuration, and a profile repository into a single logical unit. As shown in this figure, a just-in-time access 110 unit includes an authentication service 120 and a profile module 130, which includes further processing, configuration, and storage elements. Specifically, the further processing, configuration, and storage elements of the profile module 130 include a profile access manager 140, a profile configuration module 150, and a profile repository 160. The authentication service 120 typically runs as a service, but may be a module, an external authentication process, or any other manner of authenticating identity of the user. Also, the profile module 130 may run as a profile service for just-in-time access 110. Overall, just-in-time access 110 provides the user with a way to obtain privileged access to heterogeneous cloud applications/environments 170.

As shown in this figure, the user starts with user authentication via the authentication service 120 running for just-in-time access 110. After the user successfully authenticates, the user can view access profiles that are pre-assigned to the user and stored in the profile repository 160. Since the user is pre-assigned access profiles in the system that provide the user with certain levels of access to heterogeneous cloud environments 170, the user can review these pre-assigned access profiles to identify a particular access profile that would provide the user with sufficient access to a particular cloud application in the heterogeneous cloud environments 170. Once identified, the user then selects the particular access profile for check out, invoking the particular access profile to start a task in the particular cloud application. The selection and invocation of the particular access profile sends a profile check out request to the profile access manager 140 of the profile module 130. Then the system grants the user the access based on the configuration of the particular access profile—which may either grant access to the user via a user account in the heterogeneous cloud environment 170 that hosts the particular cloud application, or grant access to a temporary account mapped to the user. The system grants the user access for only a limited time period which is specified as a time limit that is pre-defined in the particular access profile. The user has then been granted access to the heterogeneous cloud environment 170 and starts interacting with the particular cloud application to work on the task at hand.

Upon completion of the task, the user terminates the session that was initiated through the particular access profile, which effectively checks in the particular access profile back into the profile repository 160. After check in, the particular access profile remains stored in the profile repository 160 for future just-in-time access or possible updating and/or reconfiguration by an admin or system user, either with or without recommendations as provided by access intelligence of the dynamic privileged access governance system. Also, when check in of the particular access profile back into the profile repository 160 is not performed by the end of the time limit, the profile module 130 of the system automatically revokes the privileged access when the time limit is reached and performs automatic check in of the particular access profile back into the profile repository 160.

Figure 2:
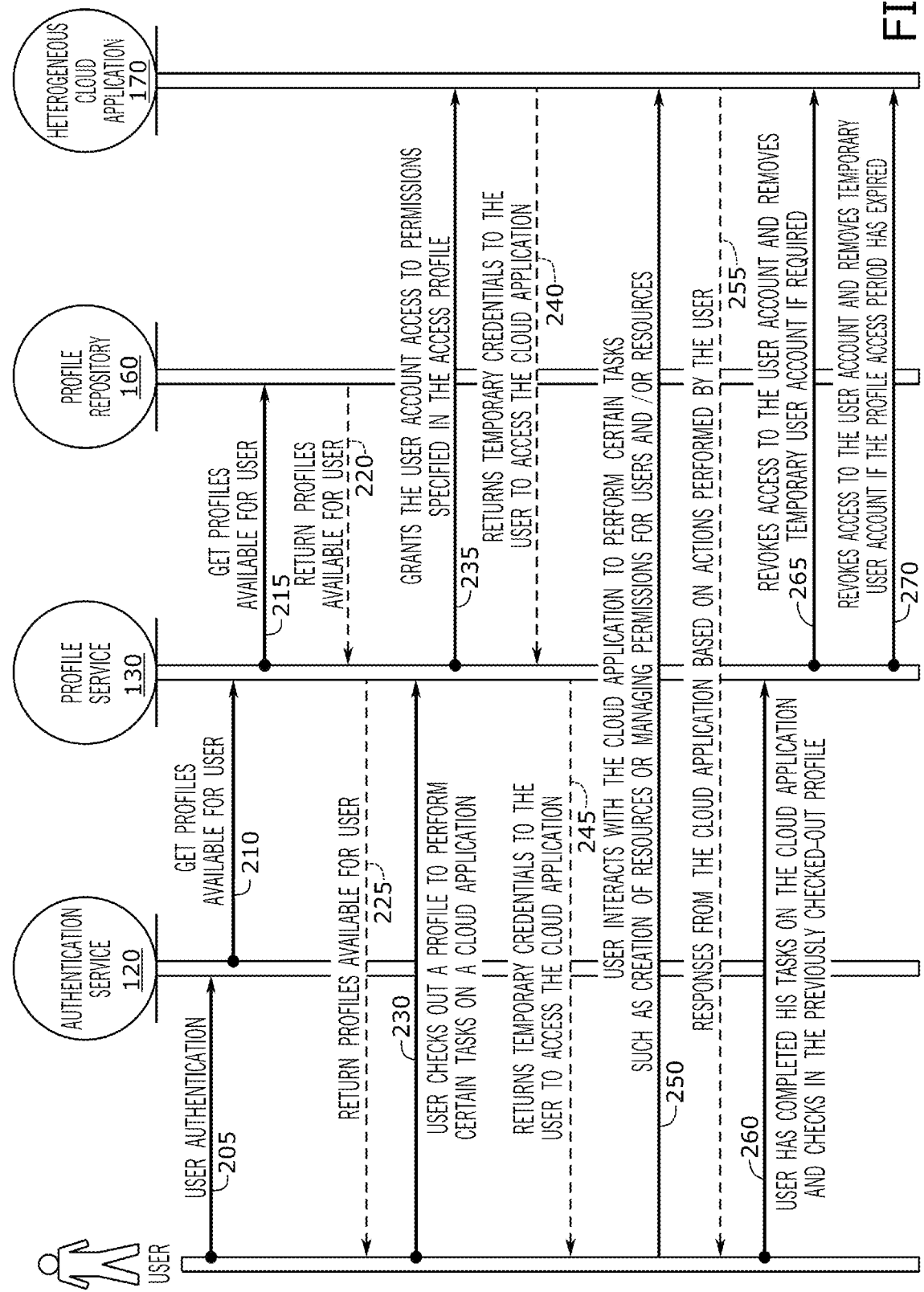
FIG. 2 conceptually illustrates a just-in-time privileged access profile check out and check in process for a user to obtain privileged access to a cloud environment in some embodiments.

By way of another example, FIG. 2 conceptually illustrates a just-in-time privileged access profile check out and check in process for a user to obtain privileged access to a cloud environment 200. As shown in this figure, the just-in-time privileged access profile check out and check in process for a user to obtain privileged access to a cloud environment 200 starts with user authentication (at 205) which is performed by the authentication service 120 based on any well-known authentication scheme (e.g., username/ password, two-factor authentication, etc.). Once authenticated, the authentication service 120 requests access profiles available for the user (at 210) from the profile service 130. The profile service 130, in turn, accesses the profile repository 160 to get the access profiles available for the user (at 215). The access profiles available for the user are then returned (at 220) to the profile service 130, which transmits the access profiles available for the user back to the user (at 225). At this point of the just-in-time privileged access profile check out and check in process for a user to obtain privileged access to a cloud environment 200, the user is able to review all of the access profiles configured for his or her use in order to identify one that would be suitable for tasks the user is to complete by a particular cloud application in a heterogeneous cloud environment.

The just-in-time privileged access profile check out and check in process for a user to obtain privileged access to a cloud environment 200 then continues to a step at which the user checks out a particular access profile to perform the tasks via the particular cloud application (at 230). The checkout of the particular access profile is processed by the profile service 130, which proceeds to grant the user account access to permissions specified in the particular access profile in connection with the particular cloud application in the heterogeneous cloud environment 170. The heterogeneous cloud environment 170 then returns, to the profile service 130, temporary credentials for the user to access the particular cloud application (at 240). The profile service 130, in turn, transmits the temporary credentials back to the user (at 245) for the user to access the particular cloud application.

After the user has obtained access permissions for the particular cloud application, the just-in-time privileged access profile check out and check in process for a user to obtain privileged access to a cloud environment 200 continues to the next step at which the user interacts with the particular cloud application (at 250) to perform the tasks as needed in connection with the heterogeneous cloud environment 170. For examples, the tasks may include creating resources or managing permissions for user and/or resources, among other tasks. The heterogeneous cloud environment 170 responds back to the user (at 255) as needed based on the actions performed by the user. When the user has completed the tasks via the particular cloud application, the user may then perform check in of the particular access profile (260). Check in of the particular access profile is received by the profile service 130 which revokes access to the user account and removes any temporary user account (at 265) for using the particular cloud application at the heterogeneous cloud environment 170. However, when the user fails to perform check in of the particular access profile by the end of the time period for access, then the profile service 130 automatically revokes access to the user account and removes any temporary user account (at 270) for using the particular cloud application at the heterogeneous cloud environment 170. In some embodiments, the profile service 130 concurrently performs automatic check in of the particular access profile when revoking access automatically due to lapsed time period. Then then just-in-time privileged access profile check out and check in process for a user to obtain privileged access to a cloud environment 200 ends.

Figure 3:
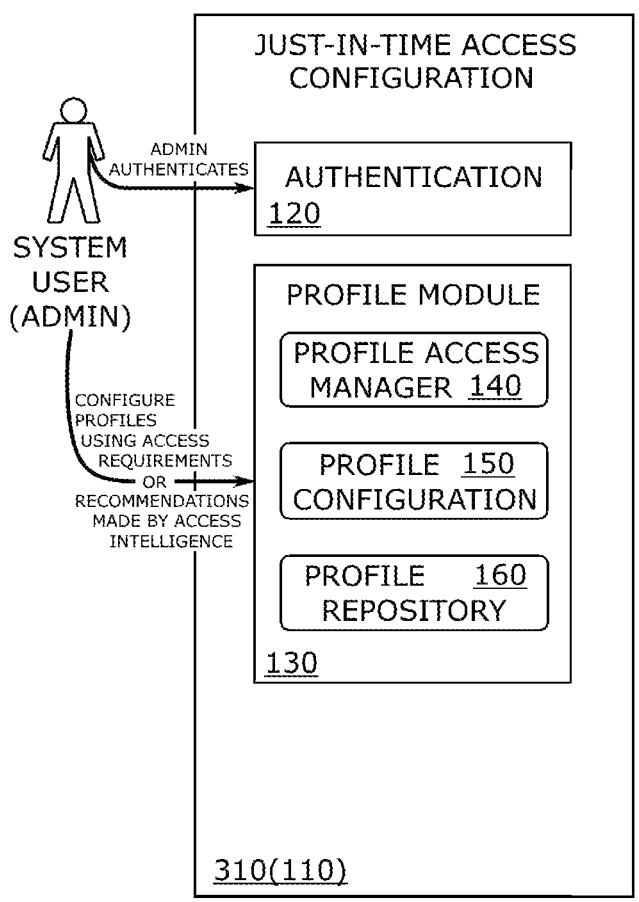
FIG. 3 conceptually illustrates a schematic view of just-in-time access configuration by an admin user in some embodiments of the dynamic privileged access governance system.

Now turning to another example, FIG. 3 conceptually illustrates a schematic view of just-in-time access configuration by an admin user in some embodiments of the dynamic privileged access governance system. As shown in this figure, the just-in-time access 110 unit is configured for just-in-time access configuration 310 for admin or system users to configure access profiles through the profile configuration module 150 of the profile module 130. The profile configuration module 150 may run as a sub-service of the profile service 130, to allow authenticated admins or other authenticated system users to configure access profiles based on access requirements or recommendations made by access intelligence of the dynamic privileged access governance system. An example process of an admin user configuring an access profile via just-in-time access configuration 310 and granting just-in-time access to a cloud environment is described next, by reference to FIG. 4.

Figure 4:
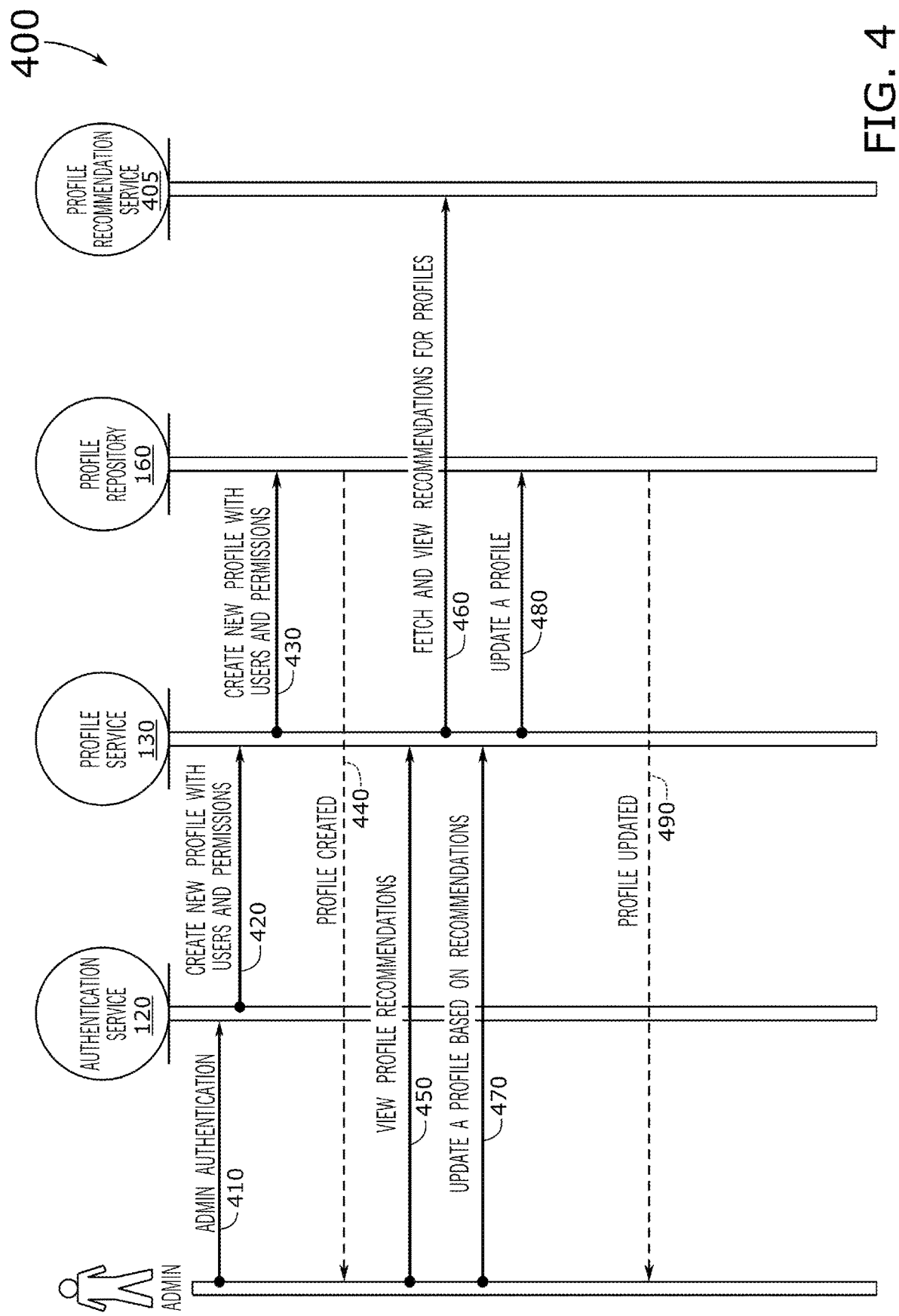
FIG. 4 conceptually illustrates a privileged access profile configuration and recommended profile update process for an admin user to configure a privileged access profile and grant just-in-time access to a cloud environment in some embodiments.

Specifically, FIG. 4 conceptually illustrates a privileged access profile configuration and recommended profile update process 400 for an admin user to configure a privileged access profile and grant just-in-time access to a cloud environment in some embodiments. As shown in this figure, the privileged access profile configuration and recommended profile update process 400 starts with admin authentication (at 410) which is processed by the authentication service 120. The admin user creates a new profile with users and permissions. The authentication service 120 then sends the newly created profile with users and permissions (at 420) to the profile service 130, which then stores the newly created profile with users and permissions (at 430) in the profile repository. The privileged access profile configuration and recommended profile update process 400 then returns to the admin user (at 440) after creation and storage in the profile repository.

In some embodiments, the privileged access profile configuration and recommended profile update process 400 allows the admin user to then view profile recommendations (at 450) by way of the profile service 130, which fetches and views recommendations for profiles (at 460) from a profile recommendation service 405 that is performed by access intelligence of the dynamic privileged access governance system. The admin user may then update a profile based on the recommendations (at 470), with the profile update provided to the profile service 130. When such profile update is performed by the admin user, the profile service 130 then updates the access profile (at 480) in the profile repository 160, which, when completed, indicates that the access profile is updated (at 490). Then the privileged access profile configuration and recommended profile update process 400 ends.

Many of the examples described above, by reference to FIGS. 1-4, refer to access intelligence of the dynamic privileged access governance system. In the next example, access intelligence of the dynamic privileged access governance system is described, by reference to FIG. 5.

Figure 5:
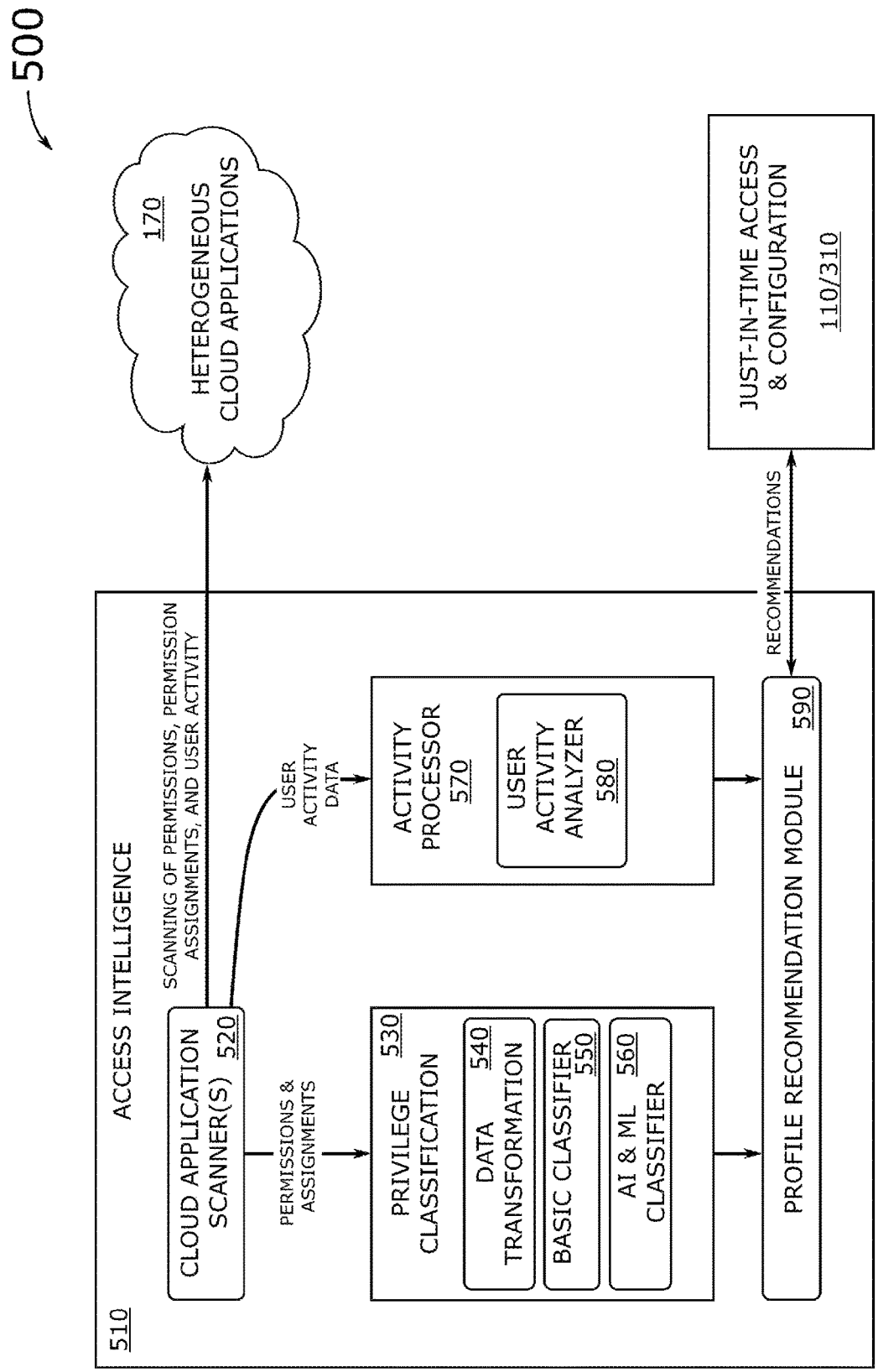
FIG. 5 conceptually illustrates a schematic view of access intelligence for the dynamic privileged access governance system in some embodiments.

Specifically, FIG. 5 conceptually illustrates a schematic view of access intelligence 510 for the dynamic privileged access governance system in some embodiments. In some embodiments, the dynamic privileged access governance system performs access intelligence 510 to provide recommendations and/or automatically tune access profiles based on user attributes, usage statistics of access profiles, and/or permissions granted by these access profiles in the heterogeneous environments. The operations performed by access intelligence 510 involve one or more service processes, which are further described below by reference to FIGS. 6-9, and may employ advanced techniques using artificial intelligence and machine learning to provide recommendations. Examples of recommendations include, without limitation, removal of users from an access profile, addition of users to an access profile, and combining or splitting access profiles.

As shown in this figure, access intelligence 510 includes one or more cloud application scanner(s) 520 (hereinafter referred to in only the singular form "cloud application scanner 520" with understanding that there may be multiple cloud application scanners 520 for access intelligence 510) that scan permissions, permission assignments, and user activity in connection with heterogeneous cloud applications 170. In some embodiments, the cloud application scanner 520 runs as a cloud application scanner service.

After scanning the heterogeneous cloud applications 170 for permissions and permission assignments, the cloud application scanner 520 sends the permissions and permission assignments data to privilege classification 530. Privilege classification 530 may be a privilege classification module and may run as a privilege classification service. Privilege classification 530 includes a data transformation unit 540 that may run as part of the privilege classification service, a basic classifier 550 that may run as part of the privilege classification service, and an enhanced AI and ML classifier 560 that may run as part of the privilege classification service. After privilege classification 530 processing of the permissions and permission assignments data, the resulting privilege classification output data is stored and sent to a profile recommendation module 590.

After scanning the heterogeneous cloud applications 170 for user activity, the cloud application scanner 520 sends the user activity data to an activity processor 570, which includes a user activity analyzer 580, which may also run as an activity analyzer service. Activity analysis data from the activity analysis is stored and sent to the profile recommendation module 590.

After receiving the privilege classification output data and the activity analysis data, the profile recommendation module 590 sends recommendations back to the user or admin user connected for just-in-time access 110 or just-in-time access configuration 310, respectively. In particular, the profile recommendation module 590 may provide recommendations based on the analytics and intelligence performed by the access intelligence of the dynamic privileged access governance system. For instance, the profile recommendation module 590 may provide recommendations such as (i) removal of user(s) from or addition of user(s) to an access profile, (ii) removal or addition of access permissions from a specific access profile, (iii) creation of new access profiles, etc.

As noted above, the dynamic privileged access governance system performs access intelligence 510 to provide recommendations and/or automatically tune access profiles based on user attributes, usage statistics of access profiles, and/or permissions granted by these access profiles in the heterogeneous environments. In some embodiments, the dynamic privileged access governance system performs the access intelligence 510 operations and processing by way of a plurality of access intelligence processes that run as services in connection with the access intelligence system. In some embodiments, the plurality of access intelligence processes that run as services in connection with the access intelligence system comprises a data ingestion service-based access intelligence process for continuously ingesting data from heterogeneous cloud applications (described further below, by reference to FIG. 6), an activity analyzer service-based access intelligence process for deriving permissions associated with activities of a user (described further below, by reference to FIG. 7), a privilege classification service-based access intelligence process for classifying permissions based on risk (described further below, by reference to FIG. 8), and a profile recommendation service-based access intelligence process for providing recommendations on creating and tuning privileged access profiles (also described further below, by reference to FIG. 9).

Figure 6:
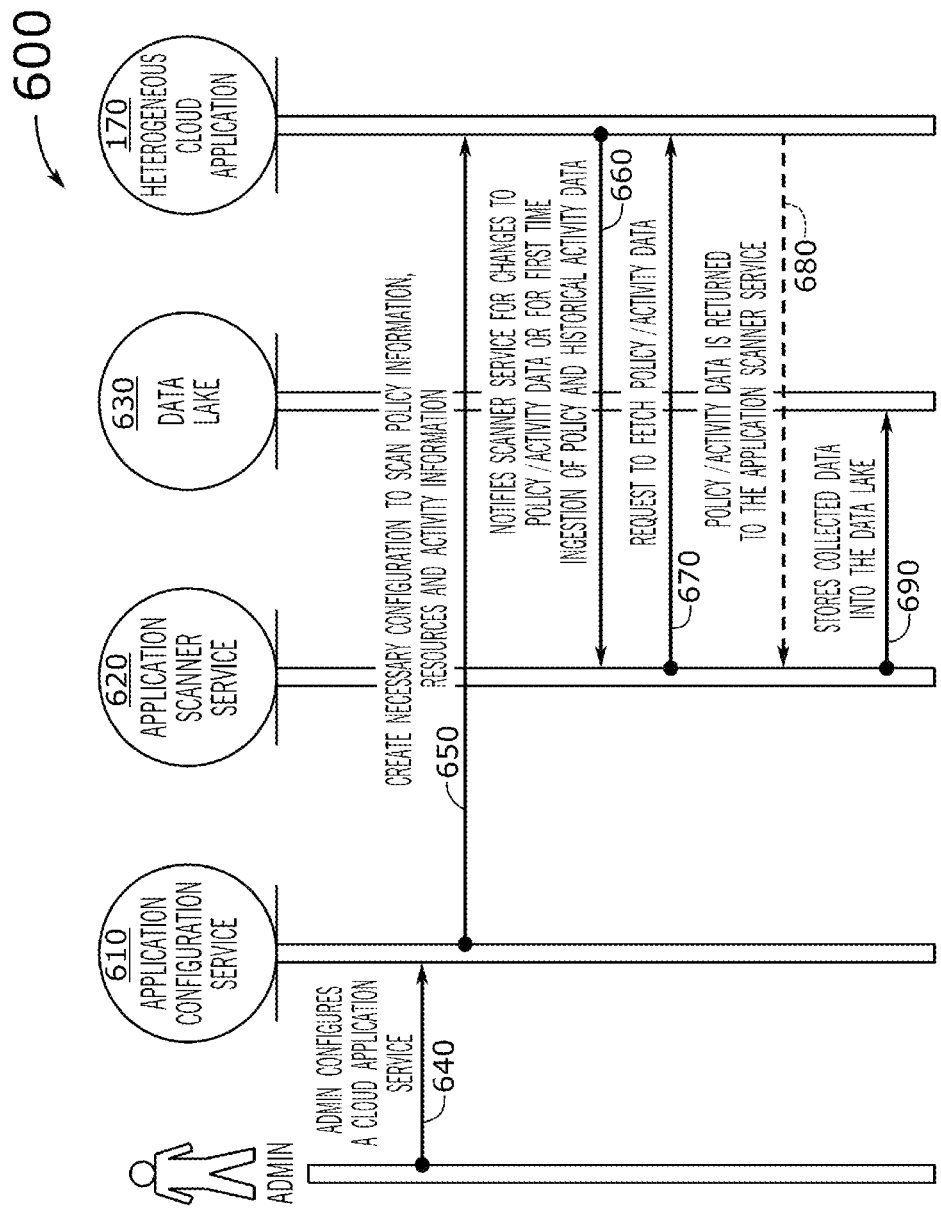
FIG. 6 conceptually illustrates a data ingestion service-based access intelligence process for continuously ingesting data from heterogeneous cloud applications in some embodiments.

Referring in the first case to a service example, FIG. 6 conceptually illustrates a data ingestion service-based access intelligence process for continuously ingesting data from heterogeneous cloud applications 600. The data ingestion service-based access intelligence process for continuously ingesting data from heterogeneous cloud applications 600 is performed in parts by the admin user, an application configuration service 610, an application scanner service 620, and a heterogeneous cloud application 170, with connection to a data lake 630 persistent storage unit.

As shown in this figure, the data ingestion service-based access intelligence process for continuously ingesting data from heterogeneous cloud applications 600 starts with the admin user configuring a cloud application service (at 640) by way of the application configuration service 610. The application configuration service 610 creates the necessary configuration to scan policy information, resources, and activity information (at 650) in connection with the heterogeneous cloud application 170. The heterogeneous cloud application 170, in turn, notifies the application scanner service 620 of changes to policy/activity data or, when the first time, ingestion policy and historical activity data (at 660). The application scanner service 620 then sends a request to the heterogeneous cloud application 170 to fetch the policy and activity data (at 670), which the heterogeneous cloud application 170 returns (at 680) to the application scanner service 620. Then the application scanner service 620 stores the collected data (at 690) into the data lake 630. Then the data ingestion service-based access intelligence process for continuously ingesting data from heterogeneous cloud applications 600 ends.

Figure 7:
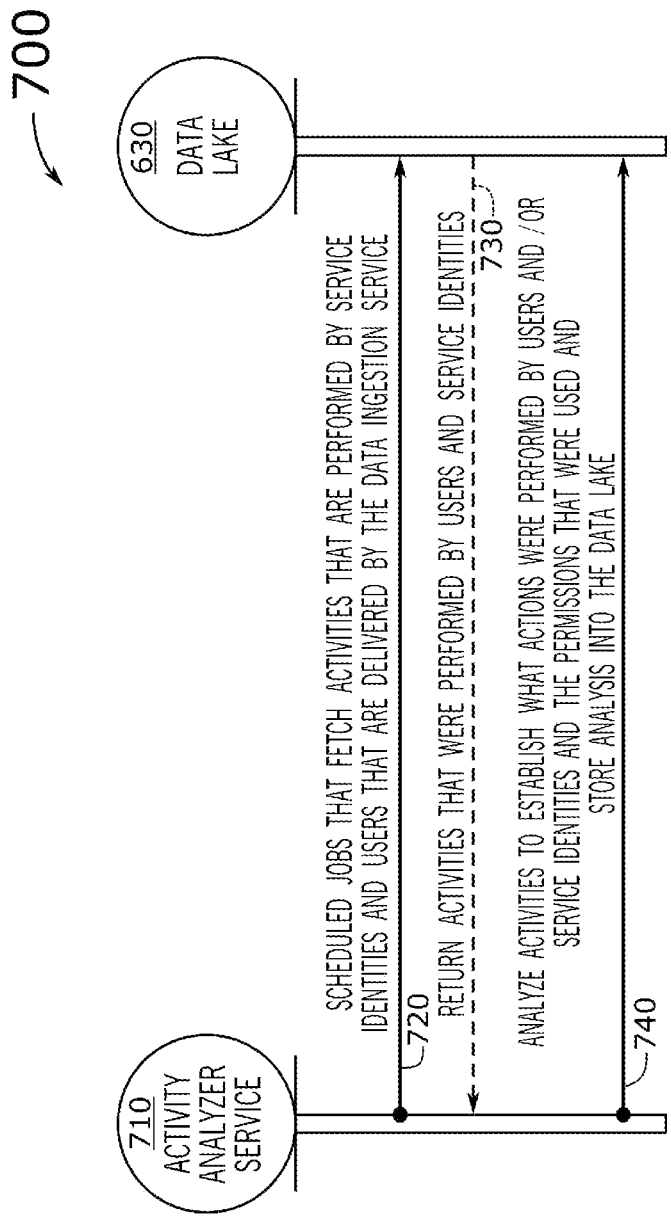
FIG. 7 conceptually illustrates an activity analyzer service-based access intelligence process for deriving permissions associated with activities of a user in some embodiments.

By way of another service example, FIG. 7 conceptually illustrates an activity analyzer service-based access intelligence process for deriving permissions associated with activities of a user 700. The activity analyzer service-based access intelligence process for deriving permissions associated with activities of a user 700 is performed by an activity analyzer service 710 in connection with the data lake 630. As shown in this figure, the activity analyzer service-based access intelligence process for deriving permissions associated with activities of a user 700 starts with one or more scheduled jobs of the activity analyzer service 710 to fetch, from the data lake 630, activities that are performed by service identities and user that are delivered by an overall data ingestion service (at 720). The data lake 630 then returns the activities that were performed by users and service identities (at 730) back to the activity analyzer service 710. Then the activity analyzer service 710 analyzes the activities to establish which actions were performed by users and/or service identities and the permissions that were used, which is followed by the activity analyzer service 710 storing the results of the analysis (at 740) into the data lake 630. Then the activity analyzer service-based access intelligence process for deriving permissions associated with activities of a user 700 ends.

Figure 8:
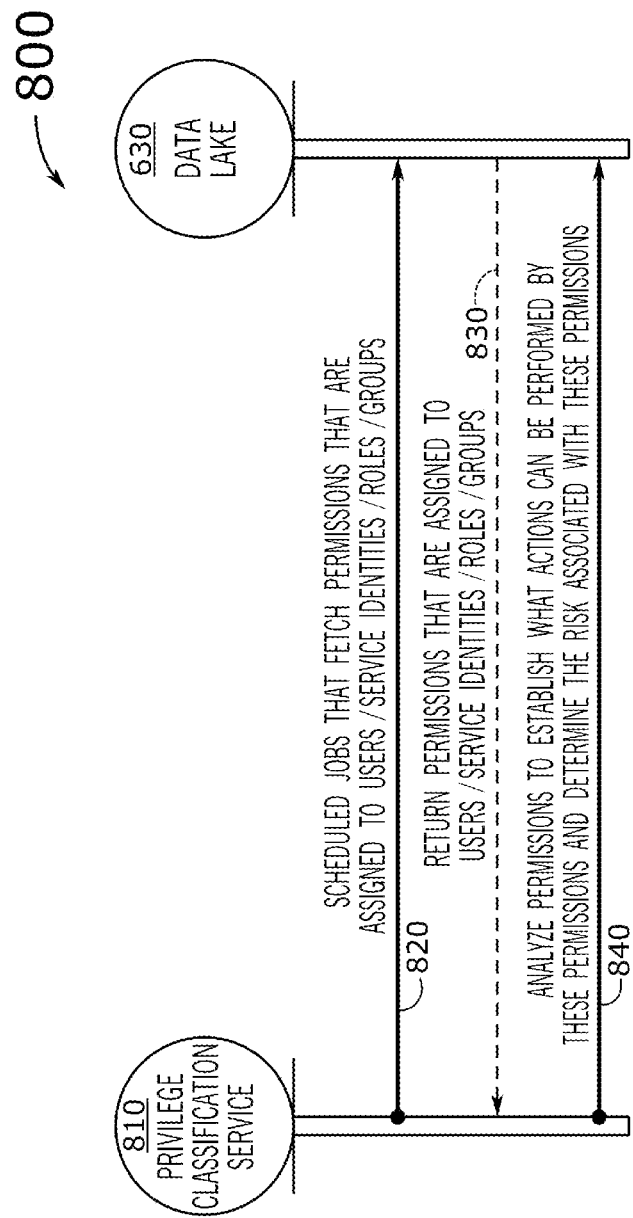
FIG. 8 conceptually illustrates a privilege classification service-based access intelligence process for classifying permissions based on risk in some embodiments.

Referring to another service example, FIG. 8 conceptually illustrates a privilege classification service-based access intelligence process for classifying permissions based on risk 800. The privilege classification service-based access intelligence process for classifying permissions based on risk 800 is performed by a privilege classification service 810 in connection with the data lake 630. As shown in this figure, the privilege classification service-based access intelligence process for classifying permissions based on risk 800 starts by the privilege classification service 810 performing scheduled job that fetch, from the data lake 630, permissions that are assigned to users, service identities, roles, or groups (at 820). Next, the data lake 630 returns the permissions that are assigned to users, service identities, roles, or groups (at 830) back to the privilege classification service 810. Then the privilege classification service 810 analyzes the permissions to establish which actions can be performed by these permissions, determine the risk associated with these permissions, and store the results of the analysis and associated risks (at 840) in the data lake 630. Then then privilege classification service-based access intelligence process for classifying permissions based on risk 800 ends.

Figure 9:
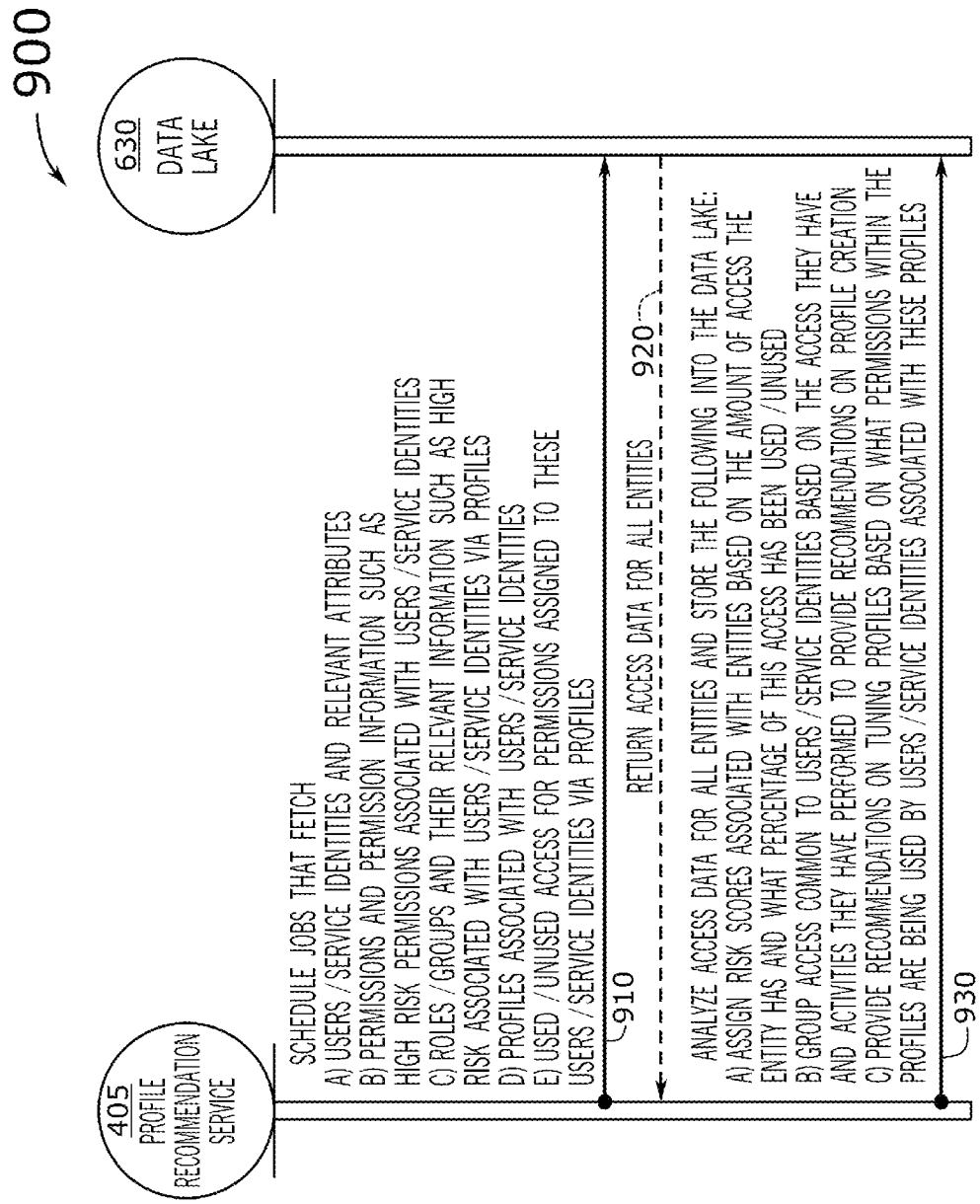
FIG. 9 conceptually illustrates a profile recommendation service-based access intelligence process for providing recommendations on creating and tuning privileged access profiles in some embodiments.

Turning to a final service example, FIG. 9 conceptually illustrates a profile recommendation service-based access intelligence process for providing recommendations on creating and tuning privileged access profiles 900. The profile recommendation service-based access intelligence process for providing recommendations on creating and tuning privileged access profiles 900 is performed by the profile recommendation service 405 in connection with the data lake 630.

As shown in this figure, the profile recommendation service-based access intelligence process for providing recommendations on creating and tuning privileged access profiles 900 starts by the profile recommendation service 405 scheduling jobs to fetch data (at 910) from the data lake 630. The data fetched from the data lake 630 includes one or more of (A) users/service identities and relevant attributes, (B) permissions and permission information, such as high risk permissions associated with users/service identities, (C) roles/groups and their relevant information, such as high risk associated with users/service identities via profiles, (D) profiles associated with users/service identities, and (E) used/unused access for permissions assigned to these users/service identities via profiles.

In the next step of the profile recommendation service-based access intelligence process for providing recommendations on creating and tuning privileged access profiles 900, the data lake 630 returns access data for all entities (at 920) back to the profile recommendation service 405. Then the profile recommendation service 405 analyzes the access data for all entities and stores additional data (at 930) into the data lake 630. The additional data stored (at 930) in the data lake 630 includes one or more of (A) risk scores associated with entities based on the amount of access the entity has and what percentage of this access has been used/unused, (B) group access common to users/service identities based on the access they have and activities they have performed to provide recommendations on profile creation, and (C) recommendations on tuning profiles based on which permissions within the profiles are being used by users/service identities associated with these profiles. Then the profile recommendation service-based access intelligence process for providing recommendations on creating and tuning privileged access profiles 900 ends.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the terms "software", "application", "app", and "mobile app" (referred to below as "software") are meant to include firmware residing in read-only memory or applications stored in magnetic storage, which can be read into memory for processing by a processor, such as the processor of a mobile computing device or a mobile communication device, such as a smartphone, a hand-held computing device, or a tablet computing device (referred to simply as a "mobile device"), or the processor of a traditional computing device, such as a server computer, a desktop computer, or a laptop computer (referred to simply as a "computer"). Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
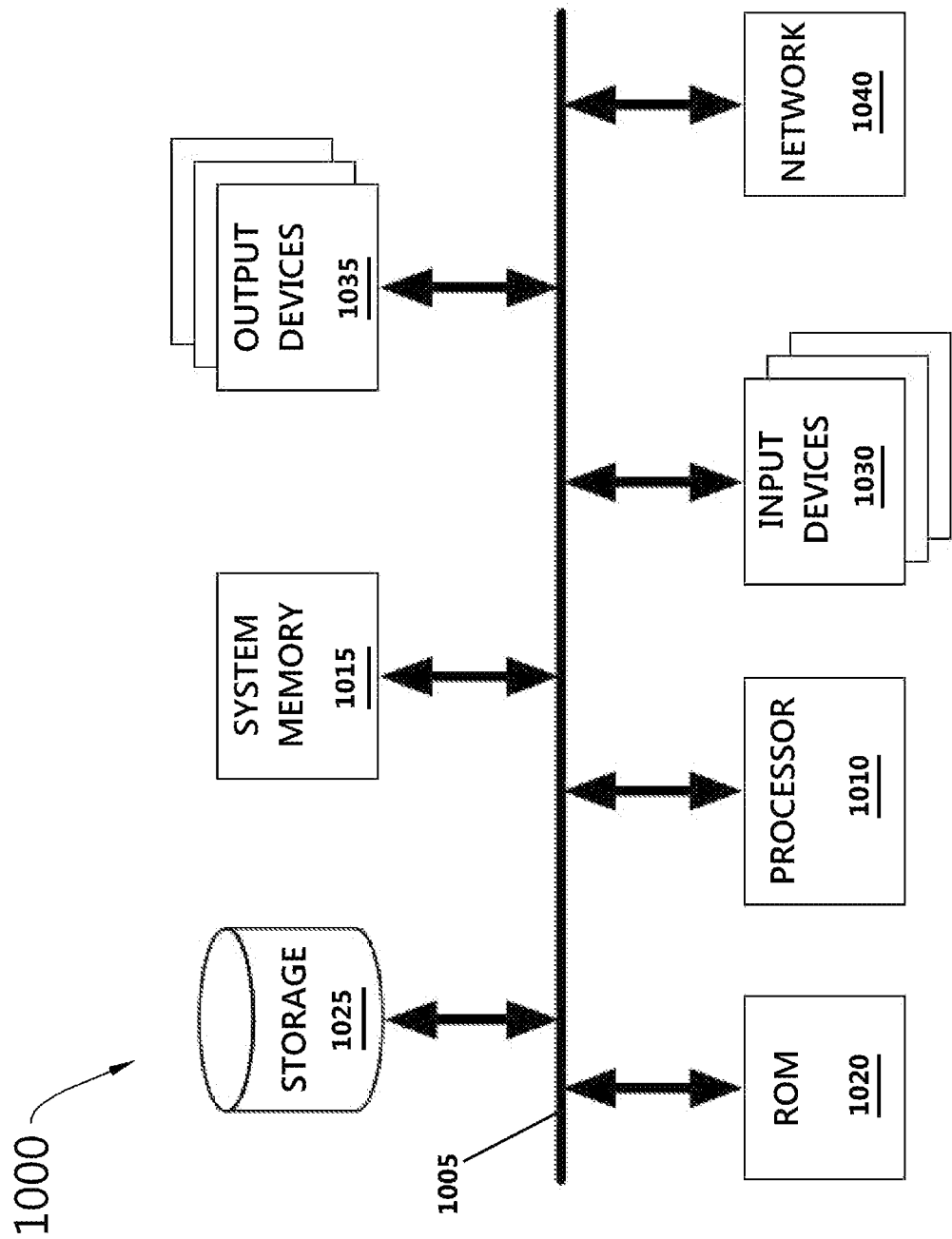
FIG. 10 conceptually illustrates an electronic system with which some embodiments of the invention are implemented.

FIG. 10 conceptually illustrates an electronic system 1000 with which some embodiments of the invention are implemented. The electronic system 1000 may be a computer, mobile device, tablet, phone, or any other sort of electronic device. Such an electronic system includes various types of computer readable media and interfaces for various other types of computer readable media. Electronic system 1000 includes a bus 1005, processing unit(s) 1010, a system memory 1015, a read-only memory 1020, a permanent storage device 1025, input devices 1030, output devices 1035, and a network 1040.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1020, the system memory 1015, and the permanent storage device 1025.

From these various memory units, the processing unit(s) 1010 retrieves instructions to execute and data to process in order to execute the processes of the invention. The processing unit(s) may be a single processor or a multi-core processor in different embodiments.

The read-only memory 1020 stores static data and instructions that are needed by the processing unit(s) 1010 and other modules of the electronic system. The permanent storage device 1025, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1025.

Other embodiments use a removable storage device (such as a floppy disk or a flash drive) as the permanent storage device 1025. Like the permanent storage device 1025, the system memory 1015 is a read-and-write memory device. However, unlike storage device 1025, the system memory 1015 is a volatile read-and-write memory, such as a random access memory. The system memory 1015 stores some of the instructions and data that the processor needs at runtime.

In some embodiments, the invention's processes are stored in the system memory 1015, the permanent storage device 1025, and/or the read-only memory 1020. For example, the various memory units include instructions for processing appearance alterations of displayable characters in accordance with some embodiments. From these various memory units, the processing unit(s) 1010 retrieves instructions to execute and data to process in order to execute the processes of some embodiments.

The bus 1005 also connects to the input and output devices 1030 and 1035. The input devices enable the user to communicate information and select commands to the electronic system. The input devices 1030 include alphanumeric keyboards and pointing devices (also called "cursor control devices"). The output devices 1035 display images generated by the electronic system 1000. The output devices 1035 include printers and display devices, such as liquid crystal displays (LCD) or organic light emitting diode (OLED) displays. Some embodiments include devices such as a touchscreen that functions as both input and output devices.

Finally, as shown in FIG. 10, bus 1005 also couples electronic system 1000 to a network 1040 through a network adapter (not shown). In this manner, the computer can be a part of a network of computers (such as a local area network ("LAN"), a wide area network ("WAN"), or an intranet), or a network of networks (such as the Internet). Any or all components of electronic system 1000 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

The above-described embodiments of the invention are presented for purposes of illustration and not of limitation. While the invention has been described with reference to numerous specific details, one of ordinary skill in the art will recognize that the invention can be embodied in other specific forms without departing from the spirit of the invention. For instance, FIGS. 2, 4, and 6-9 conceptually illustrate processes in which the specific operations of these processes may not be performed in the exact order shown and described. Specific operations may not be performed in one continuous series of operations, and different specific operations may be performed in different embodiments. Furthermore, the processes could be implemented using several sub-processes, or as part of a larger macro process. Thus, one of ordinary skill in the art would understand that the invention is not to be limited by the foregoing illustrative details, but rather is to be defined by the appended claims.

We claim:

1. A dynamic privileged access governance system that is cloud-native and adapts to the dynamic nature of cloud application environments, said dynamic privileged access governance system comprising:

a profile repository that stores access profiles pre-assigned to users ("pre-assigned access profiles") for the users to obtain access to heterogeneous cloud application environments by user-initiated check out of the pre-assigned access profiles;

a just-in-time access system that is configured to provide user-initiated check out and check in to authorized users which enables the authorized users to check out pre-assigned access profiles from the profile repository and check the pre-assigned access profiles back into the profile repository, wherein the just-in-time access system comprises (i) an authentication module that provides an authentication service configured to perform user authentication to authorize users for user-initiated check out of pre-assigned access profiles that provide the authorized users with privileged access to one or more heterogeneous cloud application environments, (ii) a profile module that provides a profile service that enables viewing access, upon successful authentication of a particular user by the authentication service, for the particular user to access and view particular pre-assigned access profiles stored in the profile repository and assigned to the particular user and to select one of the particular pre-assigned access profiles that the particular user identifies as providing sufficient access to a particular cloud application in the heterogeneous cloud application environments, (iii) a profile configuration module that maintains access profiles for privileged access to the heterogeneous cloud application environments, and (iv) a profile access manager that receives, upon selection of the selected particular pre-assigned access profile by the particular user, a profile check out request for the selected particular pre-assigned access profile and grants the particular user privileged access to the particular cloud application of the heterogeneous cloud application environments; and an access intelligence system that is communicably connected to the just-in-time access system, the profile repository, and the heterogeneous cloud application environments, wherein the access intelligence system comprises a cloud application scanner, an activity processor, and a profile recommendation module that is configured to provide recommendations, based on user activity analysis by the activity processor, to the just-in-time access system and automatically tune access profiles, maintained by the profile configuration module, for privileged access to the heterogeneous cloud application environments.

2. The dynamic privileged access governance system of claim 1, wherein the access intelligence system provides recommendations and automatically tunes access profiles for privileged access to the heterogeneous cloud application environments based on user attributes, usage statistics of access profiles, and permissions granted by these access profiles in the heterogeneous cloud application environments.

3. The dynamic privileged access governance system of claim 1, wherein the just-in-time access system only provides the particular user with the selected particular pre-assigned access profile when the user identifies and selects the particular pre-assigned access profile, by way of the profile service, as required to access to the particular cloud application in the heterogeneous cloud application environments.

4. The dynamic privileged access governance system of claim 3, wherein the just-in-time access system provides the particular user with the selected particular pre-assigned access profile which grants, to an existing account for the particular cloud application associated with the particular user, privileged access to the particular cloud application in the heterogeneous cloud application environments by directly assigning privileges from the selected particular pre-assigned access profile to the existing user account for the particular cloud application associated with the particular user.

5. The dynamic privileged access governance system of claim 3, wherein the just-in-time access system provides the particular user with the selected particular pre-assigned access profile by creating a temporary user account for the particular cloud application associated, wherein the temporary user account is granted privileged access to the particular cloud application in the heterogeneous cloud application environments when the particular user is not associated with any existing user account for the particular cloud application in the heterogeneous cloud application environments.

6. The dynamic privileged access governance system of claim 5, wherein the just-in-time access system further provides the particular user with privileged access to the particular cloud application in the heterogeneous cloud application environments by mapping the temporary user account to the particular user and assigning privileges to the temporary user account only when the particular user requires access to the particular cloud application in the heterogeneous cloud environments.

7. The dynamic privileged access governance system of claim 6, wherein the just-in-time access system manages a profile check out time period during which the particular user is granted privileged access to the particular cloud application in the heterogeneous cloud application environments.

8. The dynamic privileged access governance system of claim 7, wherein the just-in-time access system automatically revokes the particular user's privileged access to the particular cloud application in the heterogeneous cloud application environments when the profile check out time period lapses.

9. The dynamic privileged access governance system of claim 8, wherein the just-in-time access system automatically revokes the particular user's privileged access to the particular cloud application by one of (i) deleting the temporary user account in connection with the particular cloud application for the particular user, (ii) disabling the temporary user account after the profile check out time period lapses, and (iii) deleting the temporary user account after the profile check out time period lapses.

10. The dynamic privileged access governance system of claim 9, wherein the just-in-time access system automatically checks in the particular pre-assigned access profile that granted privileged access to the particular user after the profile check out time period lapses.

\* \* \* \* \*